United States Patent [19]

Walker

[11] Patent Number: 4,868,499

[45] Date of Patent: Sep. 19, 1989

[54] OBJECT DETECTOR WITH FEEDBACK WHICH HOLDS CONSTANT THE PRODUCT OF THE TRANSMITTER COIL CURRENT AND FREQUENCY TO MAINTAIN CONSTANT SENSOR VOLTAGE OUTPUT

[75] Inventor: Charles S. Walker, Seattle, Wash.

[73] Assignee: Honeywell, Inc., Minneapolis, Minn.

[21] Appl. No.: 210,459

[22] Filed: Jun. 23, 1988

[51] Int. Cl.4 .................... G01N 27/72; G01R 33/12
[52] U.S. Cl. .................................. 324/225; 324/239; 331/65
[58] Field of Search ............... 324/225, 233, 234, 236, 324/239, 326, 327, 328, 329; 331/175, 65

[56] References Cited

U.S. PATENT DOCUMENTS 4,613,815  9/1986  Christel, Jr. ...................... 324/233
4,613,830  9/1986  Kamiya et al. ..................... 324/236

Primary Examiner—Reinhard J. Eisenzopf
Assistant Examiner—Walter E. Snow
Attorney, Agent, or Firm—Whitham & Marhoefer

[57] ABSTRACT

An object detector uses product feedback in order to eliminate false indications of the presence of an object due to a change in operating frequency and/or transmitter coil current. The alternating current in the transmitter coil is measured with a capacitor, resistor and operational amplifier and rectified to develop a voltage which is compared with a reference voltage producing a constant voltage in the pickup coil. Additionally, combination feedback may be provided whereby nearly constant pickup coil voltage is maintained where a transmitting coil inductance change is associated with a geometrical change in the spacing between the transmitting coil and the pickup coil.

7 Claims, 1 Drawing Sheet

4,868,499

OBJECT DETECTOR WITH FEEDBACK WHICH HOLDS CONSTANT THE PRODUCT OF THE TRANSMITTER COIL CURRENT AND FREQUENCY TO MAINTAIN CONSTANT SENSOR VOLTAGE OUTPUT

BACKGROUND OF THE INVENTION

1. Field of the Invention

This invention generally relates to object detector systems and, more particularly, to an object detector of the type including a transmitter coil and a pickup coil between which an object to be detected passes.

2. Background of the Invention

In object detectors of the type having a transmitter coil and a pickup coil, the transmitter coil is connected to a source of alternating current and the pickup coil is connected to a detector which detects any change in voltage as a result of a metallic or magnetic object passing between the two coils. The pickup coil voltage depends on the operating frequency, the transmitter coil current and the relative geometry between the transmitter coil and the pickup coil. These values are, in turn, a function of the transmitting coil inductance, the applied voltage, and the tuning capacitor capacitance.

This type of object detector has worked well and reliably in a variety of environments including portable metal detectors and manufacturing and inventory control. However, it has been observed that if the operating frequency and/or the transmitter coil current change, the pickup coil output changes, sometimes giving a false indication that an object is present.

Object detectors of this type are disclosed, for example, in several Turner U.S. Pat. No. 4,300,097 discloses a metal detector with ferrous and non-ferrous metal identification which includes circuitry to null out the effects of mineralized soil. Dykstra et al. U.S. Pat. No. 4,325,027 discloses a metal detector which includes circuitry for tracking the amplitude of any component of the received signal attributable to distributed mineral materials so that such a component can be cancelled. Randolph, Jr., U.S. Pat. No. 4,344,034 discloses a metal detector including two detecting circuits, one providing a selective response to metal objects and the other providing a response to metal objects while excluding ground effects from the output of the first detecting circuit. Other U.S. patents of interest include Gifford No. 4,486,713 and Kerr No. 4,563,645.

While Turner, Dykstra et al. and Randolph, Jr. are examples of object detectors which include some sort of compensation to avoid false indications, the prior art does not recognize the problem that a change inoperating frequency and/or transmitter coil current can cause in this type of detector.

SUMMARY OF THE INVENTION

It is therefore an object of this invention to provide an improvement to object detectors which will eliminate false indications of the presence of an object due to a change in operating frequency and/or transmitter coil current.

According to the invention, the problem of false indications is solved by providing what is termed product feedback to maintain the product of the frequency and the peak inductor current constant. This is accomplished by placing a two turn current transformer in series with the transmitter coil. The secondary winding of the current transformer is connected to a comparator circuit which develops an error voltage which is proportional to a change in the product of the frequency and the peak inductor current. This error voltage is then used to control the voltage to a Class C amplifier which drives the transmitter coil.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
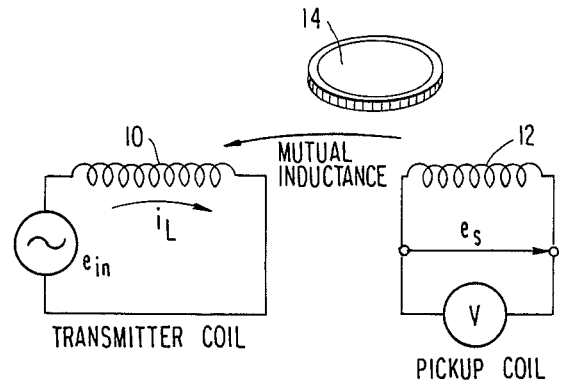
FIG. 1 is a simplified schematic diagram showing the basic components of an object detector of the type using a transmitter coil and a pickup coil.

Referring now to the drawings, and more particularly to FIG. 1, there is shown a transmitter coil 10 carrying an alternating current, $i_L$, which sets up a magnetic flux field. The pickup coil 12 intercepts some of this flux producing a signal voltage, $e_s$, at its terminals. The signal voltage is expressed by the following relationship:

$$e_s = M \, di_L/dt,$$

where M is the mutual inductance between the transmitter and pickup coils and $i_L$ is the coil current.

When a conductive object, such as the coin 14, is introduced, it changes the magnetic flux pattern changing the mutual inductance, M. The signal $e_s$ will then change because M changed, provided that $di_L/dt$ remains constant.

Figure 2:
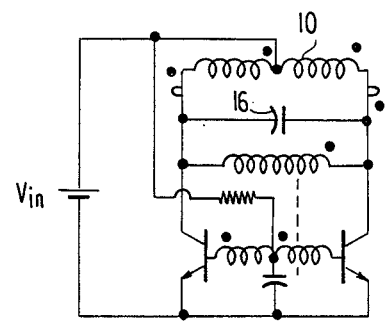
FIG. 2 is a more detailed schematic diagram showing the transmitter coil of FIG. 1 driven by a Class-C oscillator.

The transmitter coil may be driven by a Class-C oscillator as shown in FIG. 2. The coil inductor 10, together with the tuning capacitor 16, forms a parallel resonant circuit whose oscillation frequency is given very closely by the following expression:

$$f = \frac{1}{2\pi} \sqrt{\frac{1}{LC}} \text{ Hz} \tag{1}$$

As stated, the problem is that the pickup coil voltage depends on the transmitter coil voltage and self inductance and the relative geometry between the transmitter coil and the pickup coil. If any of these variables change in value, the pickup coil output changes, perhaps giving a false indication that an object is present.

The invention uses feedback control to solve this problem. In particular, product feedback is used to minimize the effects of inductance and input voltage changes. Where inductance changes are associated with geometrical changes, combination feedback is used.

Referring to FIG. 1, the pickup coil induced voltage, $e_s$, can be computed with the following equations:

$$e_s = M \, di_L/dt \tag{2}$$

$$i_L = I_{max} \sin \omega t \tag{3}$$

-continued $$e_{in} = E_{max} \sin \omega t \tag{4}$$

$$\begin{aligned} e_s &= M\, d(I_{max} \sin \omega t)/dt \\ &= \omega M\, I_{max} \cos \omega t \\ &= 2\pi f\, M\, I_{max} \cos \omega t \end{aligned} \tag{5}$$

$$I_{max} = E_{max}/\omega L \tag{6}$$

Thus, $$e_s = \frac{M}{L} E_{max} \cos \omega t \tag{7}$$

Consider now the effect of component changes on the pickup coil voltage. Using equation (7), a change in inductance, L, inversely affects $e_s$. If L increases 10%, for example, the pickup coil voltage decreases by approximately 10%. If the tuning capacitance, C, increases by 10%, equation (1) shows that the frequency will decrease by approximately 5%, but equation (7) shows $e_s$ will stay constant. The pickup coil voltage is directly proportional to the input voltage, $V_{in}$, because $E_{max}$ is almost directly proportional to $V_{in}$. Finally, the pickup coil output is directly proportional to the mutual inductance, M.

Equation (5) is the key to the present invention. It will be observed that the pickup coil voltage, $e_s$, is proportional to three factors: frequency, mutual inductance and peak inductor current. We want $e_2$ to change only when M changes because this indicates the presence of a conductive and/or magnetic object; however, we do not want $e_s$ to change because L or $V_{in}$ change. The solution, then, is to keep the product $\omega I_{max} = 2\pi f I_{max}$ constant. This is the concept of product feedback.

Figure 3:
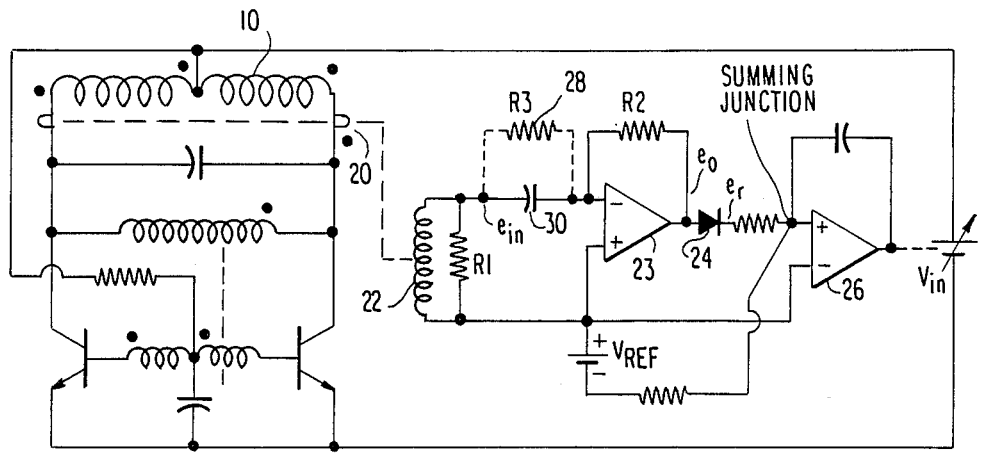
FIG. 3 is a schematic diagram of a preferred embodiment of the object detector using product feedback according to the invention.

FIG. 3 shows how this is implemented. A two turn current transformer 20 is placed in series with the transmitter coil 10. The secondary winding 22 develops a voltage across resistor $R_1$ directly proportional to the current $I_{max} \sin \omega t$ in the transmitter coil.

$$e_{in} = \frac{2}{N} R_1 I_{max} \sin \omega t$$

The output of operational amplifier 23 is as follows:

$$e_o/e_{in} = Z_f/Z_{in} = R_2/X_{C1} = \omega C_1 R_2. \tag{8}$$

Substituting for $e_{in}$, $$\begin{aligned} e_0 &= \omega C_1 R_2 \frac{2R_1}{N} I_{max} \sin \omega t \\ &= \frac{2\omega R_1 R_2 C_1}{N} I_{max} \sin \omega t \end{aligned} \tag{9}$$

where N is the number of secondary turns. A rectification circuit, shown symbolically by the diode 24, provides the following output:

$$\begin{aligned} e_r &= \frac{2}{\pi} \times \frac{2\omega R_1 R_2 C_1}{N} I_{max} \\ &= \omega I_{max} \frac{4 R_1 R_2 C_1}{\pi N} \text{ volts, d.c.} \end{aligned} \tag{10}$$

$e_r$ is compared with reference voltage $V_{REF}$. The error signal drives amplifer 26 which controls the voltage to the Class-C amplifer.

By using product feedback, it was shown that the pickup coil voltage, $e_s$, is independent of both the input voltage, $V_{in}$, and the transmitter coil inductance, L, and only dependent on a change in mutual inductance, M.

$$e_s = \omega I_{max} \times M \times \cos \omega t, \tag{5}$$

where the term $\omega I_{max}$ is held constant. Voltage feedback can be used if the input voltage, $V_{in}$, is the only variable since $E_{max} \approx V_{in}$.

$$e_s = E_{max} \times M/L \cos \omega t, \tag{7}$$

where $E_{max}$ is held constant. Current feedback can be used if $I_{max}$ is the only variable. From equation (5)

$$e_s = \omega I_{max} \times M \times \cos \omega t, \tag{5}$$

where $I_{max}$ is held constant. In some cases, a change in transmitter coil inductance may be accompanied by a transmitter/pickup coil geometric change. In this case, combination feedback is used. "Combination" feedback can refer to simultaneous product and current feedback; current, voltage and product feedback; voltage and current feedback; or product and voltage feedback.

Combination feedback provides nearly constant pickup coil voltage where a transmitting coil inductance is associated with a geometrical change. As an example, the assembly may be subjected to an external pressure forcing the transmitter coil windings closer together and the transmitter coil closer to the pickup coil. This alters both the inductance and the field as seen by the pickup coil. For long coils, the inductance is given approximately by the following expression:

$$L = 0.025\, n^2 d^2/l, \tag{11}$$

where n is the number of turns, d is the diameter and l is the length. If l is decreased L increases and equation (7) shows that $e_s$ will decrease. But moving the transmitter coil closer to the pickup coil results in more flux linkages. Hence M increases somewhat compensating for the decrease due to the inductance change. If, per chance, there were perfect compensation, equation (7) shows that voltage feedback is needed to regulate the output voltage, $E_{max}$. But if there is less than perfect compensation, combination feedback is needed which is provided by adding resistor 28 in parallel with capacitor 30.

For example, let $M = M_o(1 + \Delta_1)$. As suggested above, $\Delta_1$ is related to the change in transmitter coil inductance, L. Thus, $$e_s M_o(1 + \Delta_1)\omega I_{max} \cos \omega t, \tag{12}$$

With resistor 28 in parallel with capacitor 30, the error signal, $\epsilon$, is:

$$\begin{aligned} \epsilon &= (K_1 \omega I_{max} + K_2 I_{max}) - V_{ref} \\ &= 0 \text{ for steady state with } A_2 \text{ an integrator} \end{aligned} \tag{13}$$

Thus:

$$(K_1 \omega + K_2) I_{max} = V_{ref}, \tag{14}$$

$$I_{max} = \frac{V_{ref}}{K_1\left(\omega + \frac{K_2}{K_1}\right)} \quad (15)$$

Substituting equation (15) in equation (12) yields $$e_s = M_0(1 + \Delta_1)\frac{V_{ref}}{K_1\left(1 + \frac{K_2}{\omega K_1}\right)}\cos\omega t \quad (16)$$

Equation (11) shows that as l decreases, the inductance, L, increases which, in turn, causes the frequency, $\omega$, to become lower. Substituting $\omega = \omega_o(1-\Delta_2)$ in equation (16) yields $$e_s = M_0(1 + \Delta_1)\frac{V_{ref}\cos\omega t}{K_1\left(1 + \frac{K_2}{\omega_0 K_1(1-\Delta_2)}\right)} \quad (17)$$

When $\Delta_1$ and $\Delta_2$ are much smaller than unity, which is usually the case, $$\frac{1}{1-\Delta_2} \approx 1 + \Delta_2 \quad (18)$$

Substituting equation (18) into equation (17)

$$\begin{aligned}
e_s &= M_0(1+\Delta_1) \times \frac{V_{ref}\cos\omega t}{K_1\left(1 + \frac{K_2}{\omega_0 K_1} + \frac{K_2\Delta_2}{\omega_0 K_1}\right)} \\
&= M_0(1+\Delta_1) \times \frac{V_{ref}\cos\omega t}{K_1\left(1+\frac{K_2}{\omega_0 K_1}\right)\left(1+\frac{\omega_0 K_1}{k_2+\omega_0 K_1}\frac{K_2\Delta_2}{\omega_0 K_1}\right)} \\
&= \frac{M_0 V_{ref}}{K_1\left(1+\frac{K_2}{\omega_0 K_1}\right)} \times \frac{(1+\Delta_1)}{\left(1+\frac{K_2}{K_2+\omega_0 K_1}\Delta_2\right)}\cos\omega t
\end{aligned} \quad (19)$$

Equation (19) shows that by properly selecting $K_1$ and $K_2$, the sensor voltage change caused by an increased mutual inductance can be exactly cancelled by the frequency change, $\omega_0\Delta_2$. The foregoing example illustrated a combination of current and product feedback. Of course, while perfect cancellation is possible at the extremes, exact cancellation may not occur in between due to non-linearities.

While the invention has been described in terms of a single preferred embodiment, those skilled in the art will recognize that the invention can be practiced with modification and variation within the spirit and scope of the appended claims.

Having thus described my invention, what I claim as new and desire to secure by Letters Patent is as follows:

1. An object detector of the type having a transmitter coil and a pickup coil adjacent the path of an object to be detected, a transmitter coil driver circuit comprising:
   an oscillator connected to said transmitter coil;
   means for measuring alternating current in said transmitter coil;
   means for comparing the measured alternating current with a reference value to develop an error voltage;
   means for controlling voltage to said oscillator in order to hold constant a product of oscillation frequency and transmitter coil current; and
   combination feedback means for maintaining nearly constant pickup coil voltage where a transmitting coil inductance change is associated with a geometrical change of said transmitting coil or of the spacing between said transmitting coil and said pickup coil.

2. An object detector of the type having a transmitter coil and a pickup coil adjacent the path of an object to be detected, a transmitter coil driver circuit comprising:
   an oscillator connected to said transmitter coil;
   means for measuring alternating current in said transmitter coil;
   an operational amplifier having positive and negative inputs and an output, said negative input being connected to said means for measuring;
   a source of reference voltage connected to said positive input, said operational amplifier comparing the measured alternating current with said reference voltage to develop an error voltage at said output;
   a capacitor having a capacitance $C_1$ connected in series between said means for measuring and said negative input of said operational amplifier;
   a resistor having a resistance $R_1$ connected in shunt with said means for measuring;
   a feedback resistor having a resistance $R_2$ connected between the output and the negative input of said operational amplifier, the output $e_o$ of said amplifier being $$e_o = \frac{2\omega R_1 R_2 C_1}{N}I_{max}\sin\omega t,$$

where $\omega$ is the angular frequency of said oscillator, N is a number of secondary turns of said transmitter coil and $I_{max}$ is the maximum current flowing in said transmitter coil; and
   means for controlling voltage to said oscillator in order to hold constant a product of oscillation frequency and transmitter coil current.

3. The transmitter coil driver circuit recited in claim 2 wherein said means for measuring comprises a current transformer in series with said transmitter coil.

4. The transmitter coil driver circuit recited in claim 2, further comprising:
   rectifier means connected to the output of said operational amplifier for rectifying said error voltage; and
   amplifier means connected to said rectifier means for generating a control voltage proportional to the rectified error voltage.

5. The transmitter coil driver circuit recited in claim 4 wherein said means for measuring comprises a current transformer in series with said transmitter coil.

6. The transmitter coil driver circuit as recited in claim 2 further comprising:

rectifier means connected to the output of said operational amplifier for rectifying said output voltage $e_o$ to provide a rectified voltage $e_r$ $$e_r = \omega I_{max} \frac{4R_1R_2C_1}{\pi N} \text{ volts, d.c.; and}$$

amplifier means connected to said rectifier means for generating said error voltage as a control voltage proportional to said rectified voltage.

7. The transmitter coil driver circuit as recited in claim 2 further comprising a third resistor having a resistance $R_3$ in parallel with said capacitor, said second resistor providing combination feedback to provide nearly constant pickup coil voltage where a transmitting coil inductance change is associated with a geometrical change of said transmitting coil or of the spacing between said transmitting coil and said pickup coil.

* * * * *